(12) United States Patent
Chattin et al.

(10) Patent No.: US 10,334,827 B2
(45) Date of Patent: Jul. 2, 2019

(54) AQUARIUM WITH NIGHT LIGHT

(71) Applicant: PetSmart Home Office, Inc., Phoenix, AZ (US)

(72) Inventors: Gary Steven Chattin, Phoenix, AZ (US); Jeffrey Stocker Watson, Phoenix, AZ (US); Mia Barbaro, Philadelphia, PA (US); Tyler Joseph Lippert, Phoenix, AZ (US)

(73) Assignee: PetSmart Home Office, Inc., Phoenix, AZ (US)

( * ) Notice: Subject to any disclaimer, the term of this patent is extended or adjusted under 35 U.S.C. 154(b) by 321 days.

(21) Appl. No.: 15/256,290

(22) Filed: Sep. 2, 2016

(65) Prior Publication Data
US 2018/0064072 A1    Mar. 8, 2018

(51) Int. Cl.
| | | |
|---|---|---|
| A01K 63/00 | (2017.01) | |
| F21W 131/308 | (2006.01) | |
| F21Y 115/10 | (2016.01) | |
| F21Y 113/17 | (2016.01) | |

(52) U.S. Cl.
CPC ..... *A01K 63/003* (2013.01); *F21W 2131/308* (2013.01); *F21Y 2113/17* (2016.08); *F21Y 2115/10* (2016.08)

(58) Field of Classification Search
USPC .... 47/69; 119/265, 245, 246, 253, 267, 269; D30/101–107; D11/145; 362/809, 805, 362/807, 257, 317, 101, 318, 363; 40/444, 581
See application file for complete search history.

(56) References Cited

U.S. PATENT DOCUMENTS

| | | | | |
|---|---|---|---|---|
| 1,263,391 | A | * 4/1918 | Eickmeyer | A01K 63/003 119/246 |
| 1,871,742 | A | * 8/1932 | Sabath | A01K 63/003 119/253 |
| 1,965,323 | A | * 7/1934 | Taslitt | A01K 63/003 119/255 |
| 3,563,204 | A | 2/1971 | Szilagyi | |
| 3,749,901 | A | * 7/1973 | Clough | A01K 63/006 119/256 |
| 3,841,267 | A | 10/1974 | Miller | |
| 3,892,199 | A | 7/1975 | Huyler | |
| 4,026,243 | A | 5/1977 | Jessop, III | |
| D253,729 | S | * 12/1979 | Ward | D30/105 |
| 4,525,950 | A | * 7/1985 | Glassman | A47G 7/06 428/13 |
| D291,426 | S | * 8/1987 | Husbands | D11/145 |

(Continued)

*Primary Examiner* — Andrea M Valenti
(74) *Attorney, Agent, or Firm* — Duane Morris LLP (57) ABSTRACT

A combination night light and aquarium is disclosed having a bowl including a body portion, a bottom portion connected to the body portion, and a neck portion at a top of the bowl defining an opening at the top of the bowl, wherein the bottom portion is dimensioned to fit on the central portion when the bowl is placed on top of the base; a lid dimensioned to fit over the first opening at the top of the bowl, wherein the lid includes an inner edge portion defining an opening through the lid; and a hollow member removably or fixedly attached to the lid, the member extending into the bowl and dimensioned to receive light emitted by the one or more lighting elements when the lid is placed on top of the bowl.

20 Claims, 10 Drawing Sheets

(56) References Cited

U.S. PATENT DOCUMENTS

| | | | | |
|---|---|---|---|---|
| 4,703,720 A | * | 11/1987 | Shipman | A01K 63/003 |
| | | | | 119/261 |
| D304,246 S | * | 10/1989 | Ross, Jr. | D30/102 |
| 5,089,940 A | | 2/1992 | Lanzarone et al. | |
| 5,165,778 A | | 11/1992 | Matthias et al. | |
| 5,365,886 A | | 11/1994 | Frost | |
| D356,523 S | * | 3/1995 | Rahr | D11/143 |
| D356,979 S | * | 4/1995 | Rahr | D11/143 |
| D362,647 S | * | 9/1995 | Rahr | D11/152 |
| D388,892 S | * | 1/1998 | Ratia | D26/9 |
| 6,041,740 A | * | 3/2000 | Newman | A01K 63/045 |
| | | | | 119/253 |
| 6,447,138 B1 | * | 9/2002 | Yang | A63J 17/00 |
| | | | | 362/101 |
| D588,252 S | * | 3/2009 | Conway | D11/152 |
| 7,543,952 B1 | | 6/2009 | Chang | |
| 8,057,060 B2 | | 11/2011 | Fredricks | |
| 8,113,147 B1 | * | 2/2012 | Wang | A01K 63/06 |
| | | | | 119/267 |
| D690,057 S | * | 9/2013 | Wehr | D21/714 |
| D690,885 S | * | 10/2013 | Wu | D30/101 |
| D698,499 S | * | 1/2014 | Deng | D30/101 |
| D743,635 S | * | 11/2015 | Yu | D30/101 |
| 9,326,494 B2 | * | 5/2016 | Allen | A01K 63/06 |
| D795,505 S | * | 8/2017 | Yang | D30/101 |
| 2006/0176703 A1 | * | 8/2006 | Cayton | 362/350 |
| 2007/0277742 A1 | * | 12/2007 | Venezia | A01K 63/003 |
| | | | | 119/245 |
| 2008/0266836 A1 | | 10/2008 | Hadley | |
| 2010/0277952 A1 | * | 11/2010 | Chien | F21S 9/02 |
| | | | | 362/641 |
| 2015/0101540 A1 | * | 4/2015 | Allen | A01K 63/06 |
| | | | | 119/247 |

\* cited by examiner

AQUARIUM WITH NIGHT LIGHT

BACKGROUND

Aquariums provide an aesthetically pleasing, relaxing display of motion and color. Aquatic scenes also promote curiosity and interest as they capture the eye and imagination of a viewer. Certain lighted displays share these same positive attributes. Accordingly, it would be beneficial to combine the beneficial aspects of aquariums and lighted displays to enhance viewing pleasure and/or the ambience of a room.

SUMMARY

In some embodiments of the present disclosure, an apparatus which combines an aquarium and a lighted display is disclosed where the apparatus comprises a bowl including a body portion, a bottom portion connected to the body portion, and a neck portion at a top of the bowl defining a first opening at the top of the bowl, wherein the bottom portion is dimensioned to fit on the central portion when the bowl is placed on top of the base; a lid dimensioned to fit over the first opening at the top of the bowl, wherein the lid includes an inner edge portion defining a second opening through the lid; and a hollow member removably or fixedly attached to the lid, the member extending into the bowl and dimensioned to receive light emitted by the one or more lighting elements when the lid is placed on top of the bowl.

In further embodiments, the lid has a recessed portion including a horizontal section connected to the inner edge portion and disposed on at least a segment of a periphery of the second opening. Additionally, the apparatus may include a first removable disk having a first plurality of apertures there through, wherein the first removable disk is dimensioned to rest on the horizontal section. Also, the apparatus may include a second removable disk having a second plurality of apertures there through, wherein the second removable disk is dimensioned to rest on the horizontal section, and wherein the second removable disk is interchangeable with the first removable disk. In certain embodiments, ones of the first plurality of apertures are of a shape that is different than a shape of ones of the second plurality of apertures. In certain other embodiments, one of the first plurality of apertures is of a same shape but a different size than another one of the first plurality of apertures.

In still further embodiments, the lid includes an indentation region operatively connected to the horizontal section for facilitating removal of the first removable disk.

In another embodiment, the light emitted by the one or more lighting elements passes through the hollow member and through ones of the first plurality of apertures when the first removable disk is resting on the horizontal section.

In yet another embodiment, a side of the hollow member is translucent, while in another embodiment the hollow member is opaque and includes one or more third apertures along a side of the member.

In an embodiment, the at least one of the one or more lighting elements is a light emitting diode, while in a further embodiment the light emitted by the one or more lighting elements changes color over time, while in a still further embodiment a first one of the one or more lighting elements emits light having a first color and a second one of the one or more lighting elements emits light having a second color.

In another embodiment the base includes a port for receiving an electrical cable for providing electrical power to the one or more lighting elements, while in another embodiment the base includes a battery receptacle and a switch operatively coupled to the battery receptacle and to the one or more lighting elements.

In yet still another embodiment, an apparatus which combines an aquarium and a lighted display is disclosed where the apparatus includes a circular base including a central portion, one or more lighting elements disposed in the central portion, and a circular raised ridge at least partially surrounding the central portion; a bowl including a body portion, a circular bottom portion connected to the body portion, and a circular neck portion at a top of the bowl defining a circular opening at the top of the bowl, wherein the bottom portion is dimensioned to fit within the raised ridge when the bowl is placed on top of the base; an annular lid having an outer boundary at an outer diameter and an inner boundary at an inner diameter, the annular lid dimensioned to fit over the circular opening at the top of the bowl, wherein the annular lid includes a downwardly-extending portion at the inner boundary; and a cylindrical hollow member removably or fixedly attached to the downwardly-extending portion, the member extending into the bowl and dimensioned to receive light emitted by the one or more lighting elements when the lid is placed on top of the bowl.

In another embodiment, the annular lid further includes a lip extending downwardly from the outer boundary wherein the outer diameter is dimensioned to cause the lip to surround the circular neck portion when the lid is placed on top of the bowl. In still another embodiment, the apparatus includes a recessed portion at the inner boundary wherein the recessed portion includes a horizontal section, and further comprising a first removable disk having a first plurality of apertures there through, wherein the first removable disk is dimensioned to rest on the horizontal section. In yet a further embodiment, the light emitted by the one or more lighting elements passes through the cylindrical hollow member and through ones of the first plurality of apertures when the first removable disk is resting on the horizontal section.

In an even further embodiment, an apparatus which combines an aquarium and a lighted display is disclosed where the apparatus includes a base including a central portion, one or more lighting elements disposed in the central portion, and a raised ridge at least partially surrounding the central portion; a bowl including a body portion, a bottom portion connected to the body portion, and a neck portion at a top of the bowl defining a first opening at the top of the bowl, wherein the bottom portion is dimensioned to fit within the raised ridge when the bowl is placed on top of the base; a lid dimensioned to fit over the first opening at the top of the bowl, wherein the lid includes a downwardly-extending portion defining a second opening through the lid, and wherein the lid has a recessed portion including a horizontal section connected to the downwardly-extending portion and surrounding the second opening; a first removable disk having a first plurality of apertures there through, wherein the first removable disk is dimensioned to rest on the horizontal section; and a translucent hollow member removably or fixedly attached to the downwardly-extending portion, the member extending into the bowl and dimensioned to receive light emitted by the one or more lighting elements when the lid is placed on top of the bowl, wherein light emitted by the one or more lighting elements passes through the member and through ones of the first plurality of apertures when the first removable disk is resting on the horizontal section, and wherein the base includes a port for receiving an electrical cable for providing electrical power to the one or more lighting elements.

These and other embodiments will become apparent to one of skill in the art upon the reading and understanding of the attached figures and associated detailed description.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific night light aquariums, it is to be understood that the discussion is not intended to limit the scope of the present subject matter in any way and that the principles presented are equally applicable to other systems and/or methods for remote measurement and process control solutions.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a night light aquarium are described.

Figure 1:
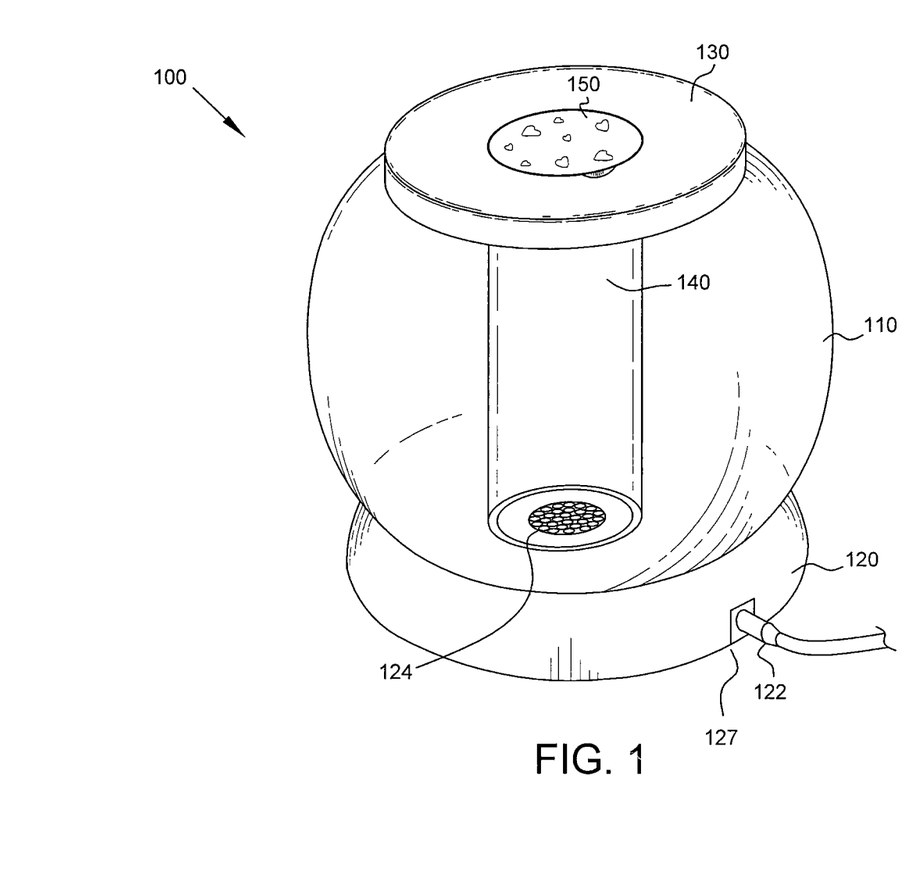
FIG. 1 is a perspective view of a night light aquarium according to an embodiment of the present subject matter.

With attention drawn to FIG. 1, a perspective view of a night light aquarium 100 according to an embodiment of the present subject matter is shown. The night light aquarium 100 includes a bowl 110, a base 120, a lid 130, and a hollow member 140. The bowl 110 is typically made from a transparent material including, but not limited to, glass, plastic, acrylic, or any similar material. While the bowl depicted in FIG. 1 is shown as generally globular, other shapes are contemplated herein (e.g., cubical, cylindrical, polyhedral, frustum, etc.)

Figure 8:
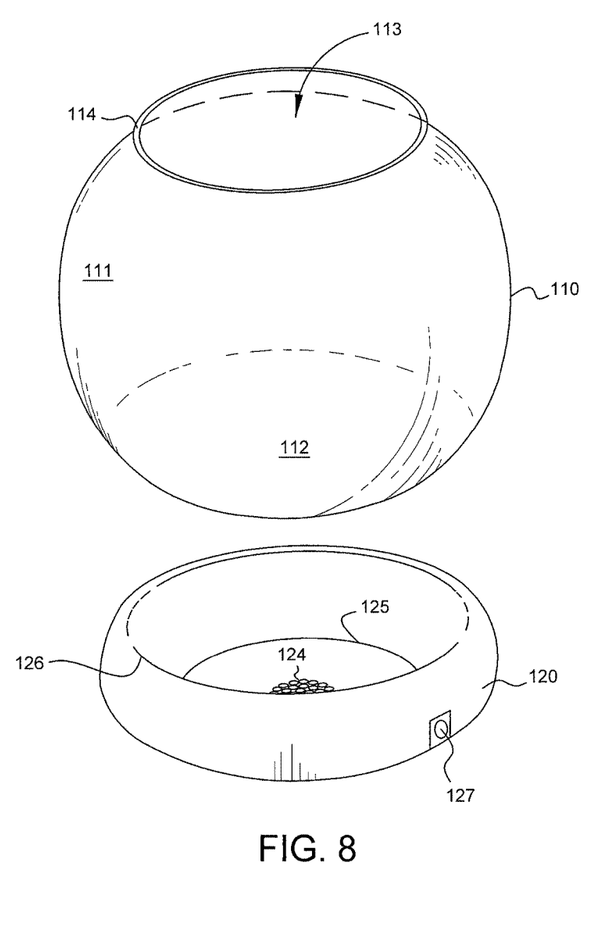
FIG. 8 is a perspective view of a bowl and base for a night light aquarium according to an embodiment of the present subject matter.

As shown in more detail in FIG. 8, the bowl has a body portion 111, a bottom portion 112, and a neck portion 114. The neck portion defines an opening 113 at the top of the bowl as shown in FIG. 8. These features will be discussed in further detail below. Also as shown in more detail in FIG. 8, the base 120 may include a central portion 125, one or more lighting elements 124 located in the central portion, and a raised ridge 126. In certain embodiments the base 120, while shown as circular, may be a shape other than circular (e.g., triangular, square, polygonal, etc.) The shape of the base does not necessarily have to be the same general shape as the shape of the bowl.

Returning to FIG. 1, the base 120 may have a port 127 for receiving an electrical cable 122 for providing electrical power to the one or more lighting elements 124. Alternatively, the base 120 may include a battery receptacle (not shown for clarity) and a switch (not shown for clarity) operatively connected to the battery receptacle and the one or more lighting elements 124.

Figure 5:
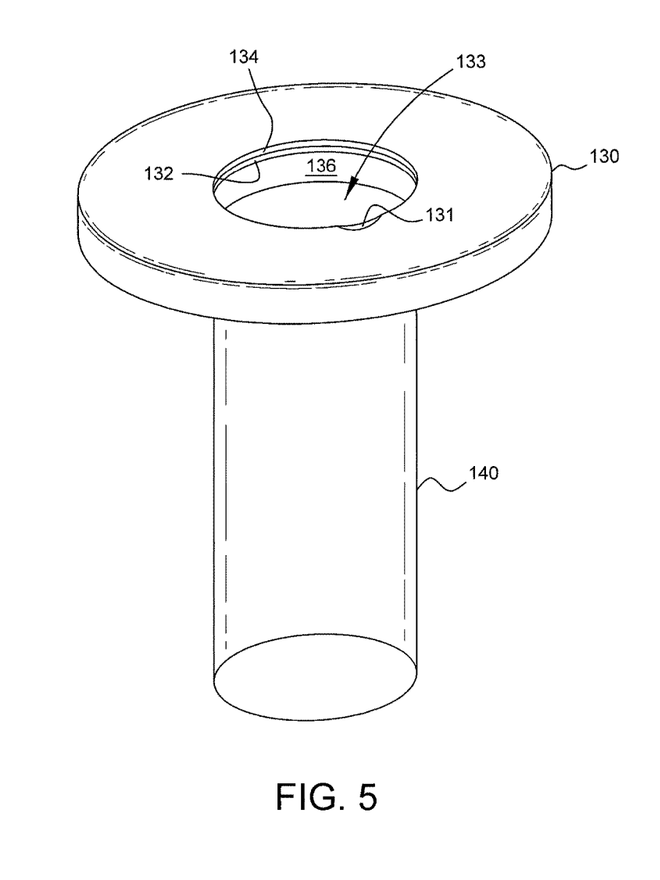
FIG. 5 is a perspective view of a lid and hollow member for a night light aquarium according to an embodiment of the present subject matter.

The lid 130 is dimensioned to fit over the opening 113 at the top of the bowl. In an embodiment, the lid has an opening 133 through it as shown in FIGS. 5 and 7. The lid may be attached to hollow member 140 and the lid may also provide a seating for a removable disk 150, which preferably fits over the opening 133 in the lid. The hollow member 140 may be transparent, translucent, or opaque. In an embodiment, the hollow member 140 is dimensioned to receive light emitted by the one or more lighting elements 124 when the hollow member is attached to the lid 130 and the lid rests on the bowl 110 covering the opening 113 in the bowl. Thus, light emitted by the one or more lighting elements 124 will travel through the hollow member 140, through the opening 133 in the lid, and through the apertures 142 (described in more detail below) in removable disk 150 and may then shine on a surface above the aquarium 100, such as, for example, a ceiling of a room. Some of the light traveling through the hollow member 140 may be refracted or reflected such that it passes through the hollow member (i.e., if the hollow member is transparent or translucent, or through apertures in the hollow member if the hollow member is opaque) and into the bowl 110. Thus, the light from the one or more lighting elements 124 may illuminate both a surface above the aquarium 100 and the aquarium itself. The lid 130 will be discussed in more detail below with reference to FIG. 5. The hollow member 140 will be discussed in more detail below with reference to FIGS. 5-7. The removable disk 150 will be discussed in more detail below with reference to FIGS. 3 and 7.

Figure 2:
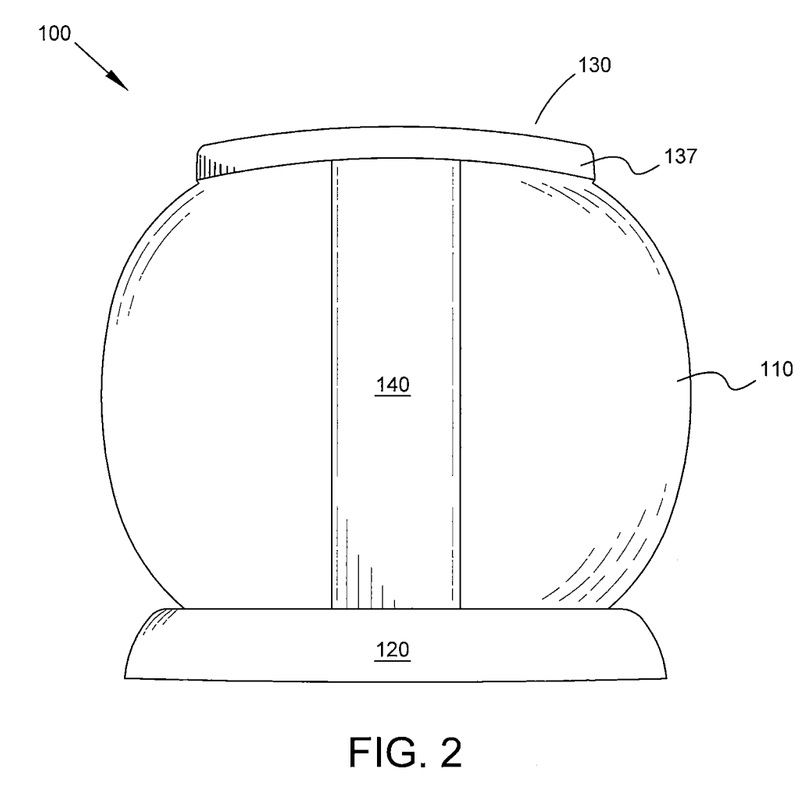
FIG. 2 is a front elevation view of a night light aquarium according to an embodiment of the present subject matter.

Now turning to FIG. 2, a front elevation view of a night light aquarium 100 is shown according to an embodiment of the present subject matter. As shown in FIG. 2, in an embodiment the base 120 supports the bowl 110 which supports the lid 130. The hollow member 140 is removably or fixedly attached to the lid 130 and extends into the bowl 110. In an embodiment, the hollow member 140 is not sealed to the bottom portion 112 of the bowl, thus when the bowl is filled with water, the water infiltrates into the hollow member. In an alternative embodiment, the hollow member 140 is sealed to the bottom portion 112 of the bowl, thus when the bowl is filled with water, the water is kept out of the hollow member.

The lid 130 may include a lip 137 extending downwardly from the outer boundary of the lid where the lid 130 and lip 137 are dimensioned such that the lip 137 surrounds the circular neck portion 114 (shown in FIG. 8) when the lid is placed on top of the bowl.

Figure 3:
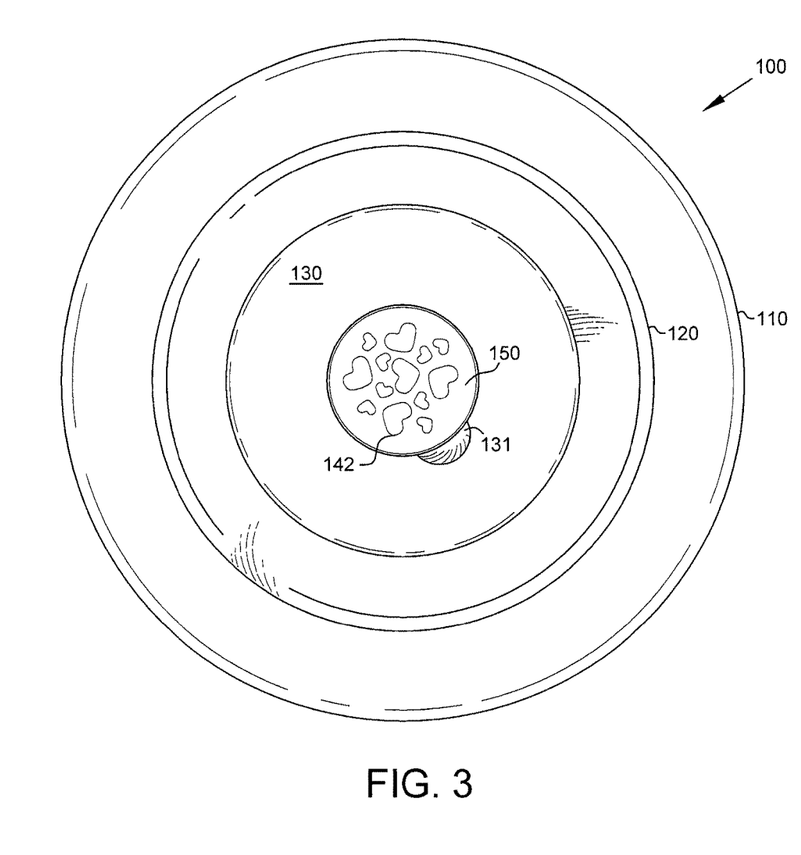
FIG. 3 is a top plan view of a night light aquarium according to an embodiment of the present subject matter.

FIG. 3 illustrates a top plan view of a night light aquarium 100 according to an embodiment of the present subject matter. In FIG. 3, the lid 130 rests on the top of the bowl 100 which rests on the base 120 (as seen through the bowl). The removable disk 150, which includes apertures 142 having a first shape (shown as hearts), rests on the lid 130 and covers the opening 133 in the lid. In an embodiment, the top of the removable disk 150 is flush with the top of the lid 130. In order to facilitate the removal of the removable disk from the lid, the lid has an indentation region 131 allowing a user to easily remove the removable disk.

Figure 4:
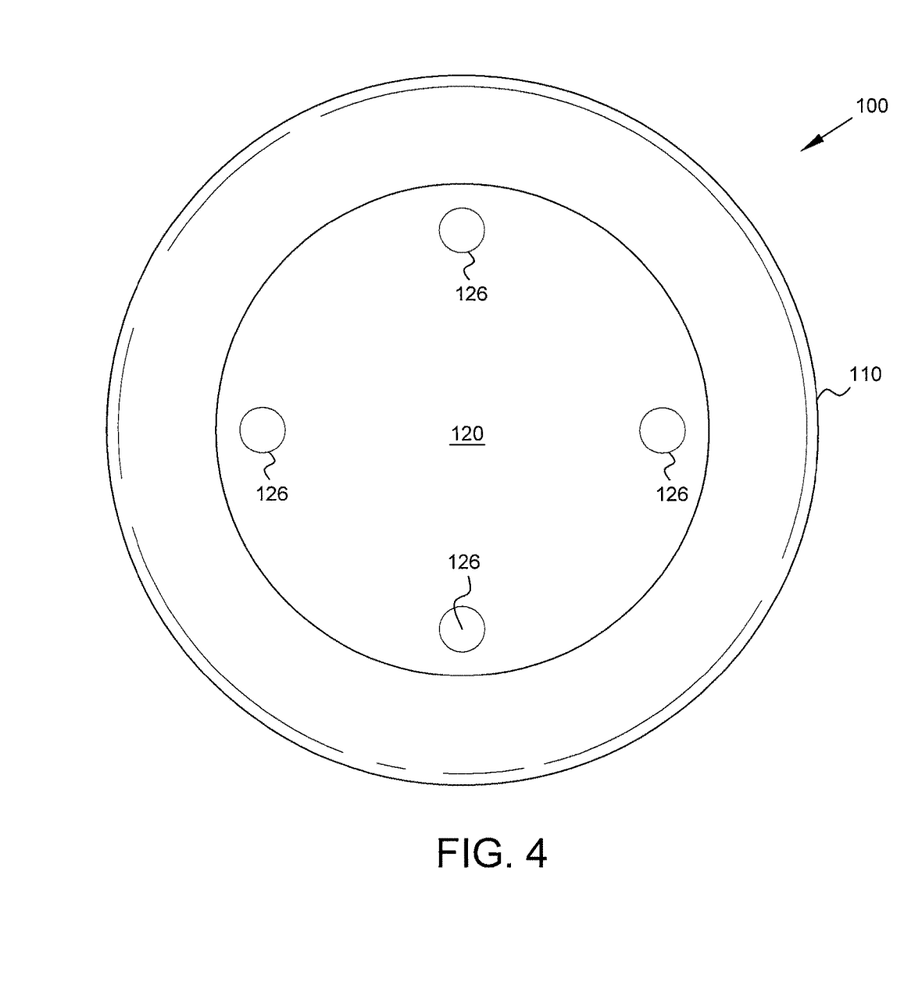
FIG. 4 is a bottom plan view of a night light aquarium according to an embodiment of the present subject matter.

Considering FIG. 4, a bottom plan view of a night light aquarium 100 is shown according to an embodiment of the present subject matter. In this embodiment, the base 120 includes a plurality of feet 126 to support the base and keep the bowl 110 level. In an embodiment, the feet 126 are each independently adjustable so as to provide means for keeping the bowl 110 level (or, if desired, canted at an angle).

Now considering FIG. 5, a perspective view is shown of the lid 130 and the hollow member 140 according to an embodiment of the present subject matter. As seen in FIG. 5, the lid 130 has an opening 133 defined by an inner edge portion 134. In an embodiment, a recessed portion of the lid is defined by the inner edge portion 134 and a horizontal section 132 connected to the inner edge portion. This recessed portion is dimensioned to accept and support the removable disk 150 which is dimensioned to rest on the horizontal section 132. In another embodiment, the horizontal section 132 is disposed on at least a segment of a periphery of the second opening 133 and/or inner edge portion 134. In an embodiment, the inner edge portion 134 (or inner boundary) includes a downwardly-extending portion 136 to which the hollow member 140 may be fixedly or removably attached.

Figure 6:
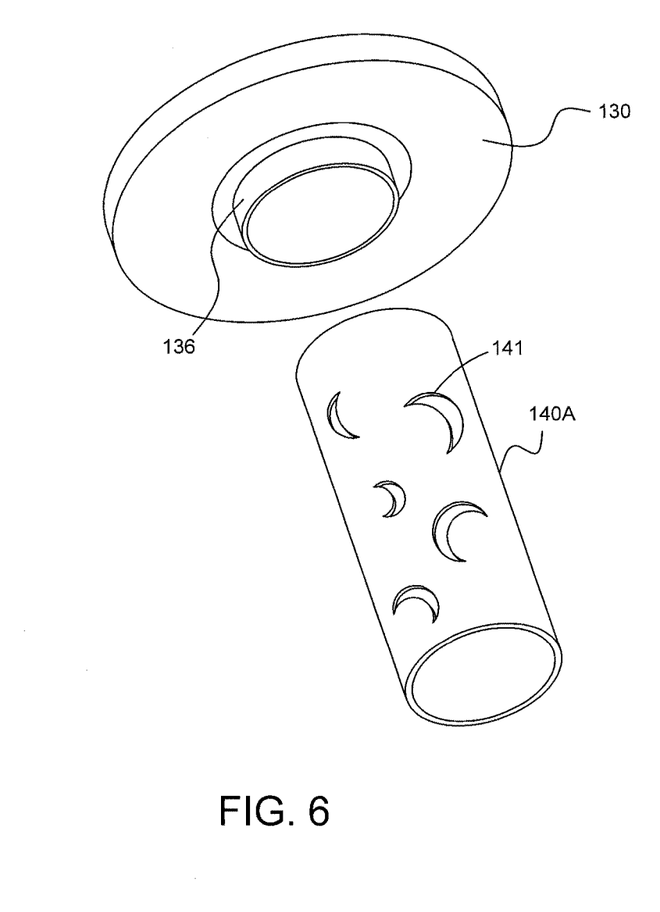
FIG. 6 is another perspective view of a lid and hollow member for a night light aquarium according to an embodiment of the present subject matter.
Figure 7:
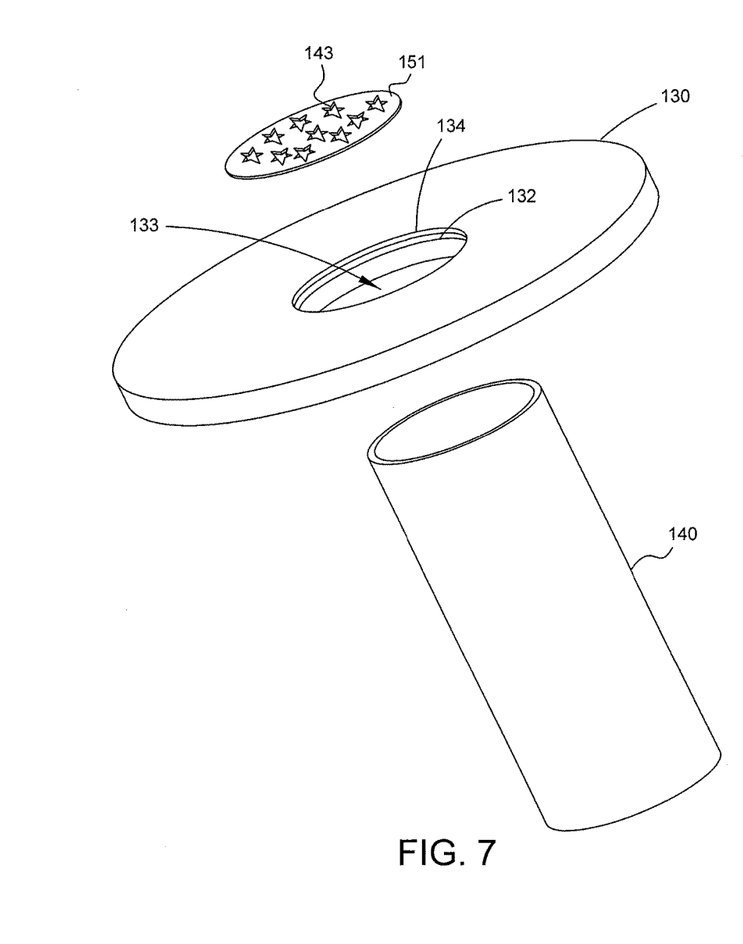
FIG. 7 is a perspective view of a lid, hollow member, and a removable disk with apertures for a night light aquarium according to an embodiment of the present subject matter.

FIG. 6 shows another perspective view showing the underside of the lid 130, the downwardly-extending portion 136, and an opaque hollow member 140A having apertures 141, according to an embodiment of the present subject matter. In an embodiment, the hollow member 140 or 140A may snuggly fit to the downwardly-extending portion 136 so that the hollow member remains attached to the lid through friction. In other embodiments, the hollow member 140 may pass through the opening in the lid 133 (as seen, e.g., in FIG. 5) and may have a flange at the top of the opening member that rests on the top of the lid 130.

FIG. 7 depicts yet another perspective view of the lid 130, the hollow member 140, and a removable disk 151, which includes apertures 143 having a second shape (shown as stars), according to an embodiment of the present subject matter. The lid 130, as described previously, has a recessed portion defined by the inner edge portion 134 and a horizontal section 132 connected to the inner edge portion. This recessed portion is dimensioned to accept and support the removable disk 150 which is dimensioned to rest on the horizontal section 132.

It will be noted that the removable disk 150 in FIG. 3 has heart-shaped apertures 142 and the removable disk 151 in FIG. 7 has star-shaped apertures 143. In an embodiment, the removable disks 150 and 151 are interchangeable. One of skill in the art will readily understand that various aperture shapes are contemplated herein and that more than two removable disks may be used. Additionally, the apertures on any one removable disk may be the same or different shapes and/or may be the same or different sizes.

With attention now drawn to FIG. 8, a perspective view is presented of the bowl 110 (as described above) and the base 120 (as described above) for a night light aquarium according to an embodiment of the present subject matter. In an embodiment, the base 120 includes a central portion 125 containing one or more lighting elements 124. One or more of the one or more lighting elements 124 may be a light emitting diode. In an embodiment, the color of light emitted by a first one of the lighting elements 124 may be different than the color of light emitted by a second one of the lighting elements 124. In another embodiment, the light emitted by one or more of the one or more lighting elements 124 may change color over time.

In an embodiment, the base 120 may include a raised portion 126 which fully or partially surrounds the central portion 125, and the bottom portion 112 of the bowl 110 is dimensioned to fit on the central portion 125 such that the raised portion 126 prevents the bowl from slipping off of the base 120.

Figure 9:
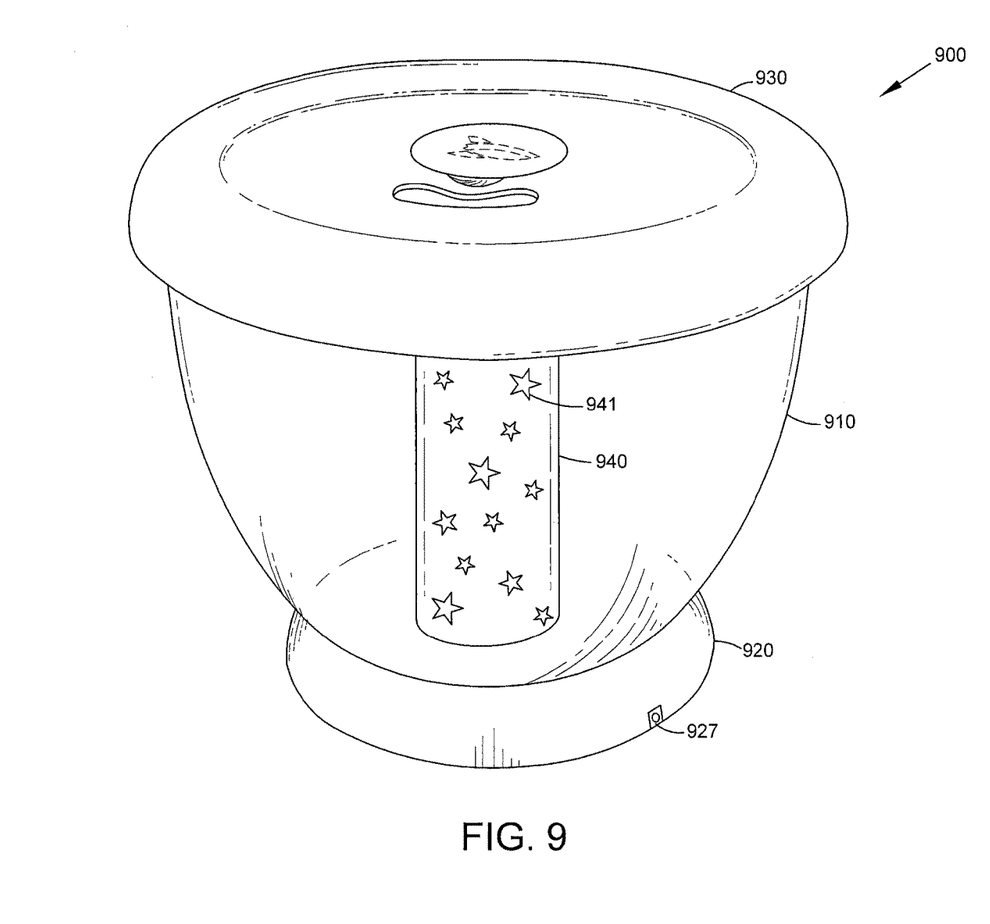
FIG. 9 is a perspective view of a night light aquarium according to an embodiment of the present subject matter.

Now considering FIG. 9, a perspective view of a night light aquarium according to an embodiment of the present subject matter is shown. The bowl 910 is shaped in the fashion of a "salad bowl", i.e., the sides are curved upwards with a diameter that increases from the base to the top of the bowl. The base 920 may be similar to the base 120 shown in FIG. 8, including the one or more lighting elements 124, and may be dimensioned to accept a bowl of the shape of bowl 110 as well as a bowl of the shape of bowl 910. Similar to port 127 in FIG. 8, port 927 receives an electrical cable for providing electrical power to the one or more lighting elements 124 (not shown in FIG. 9).

Returning attention to FIG. 9, in certain embodiments hollow member 940 is opaque and may have apertures 941, as described above with respect to FIG. 6, which may generally be of any shape. Hollow member 940 may be attached to lid 930 in a manner similar to that described above with respect to hollow member 140 and lid 130 in FIGS. 5-7.

Figure 10:
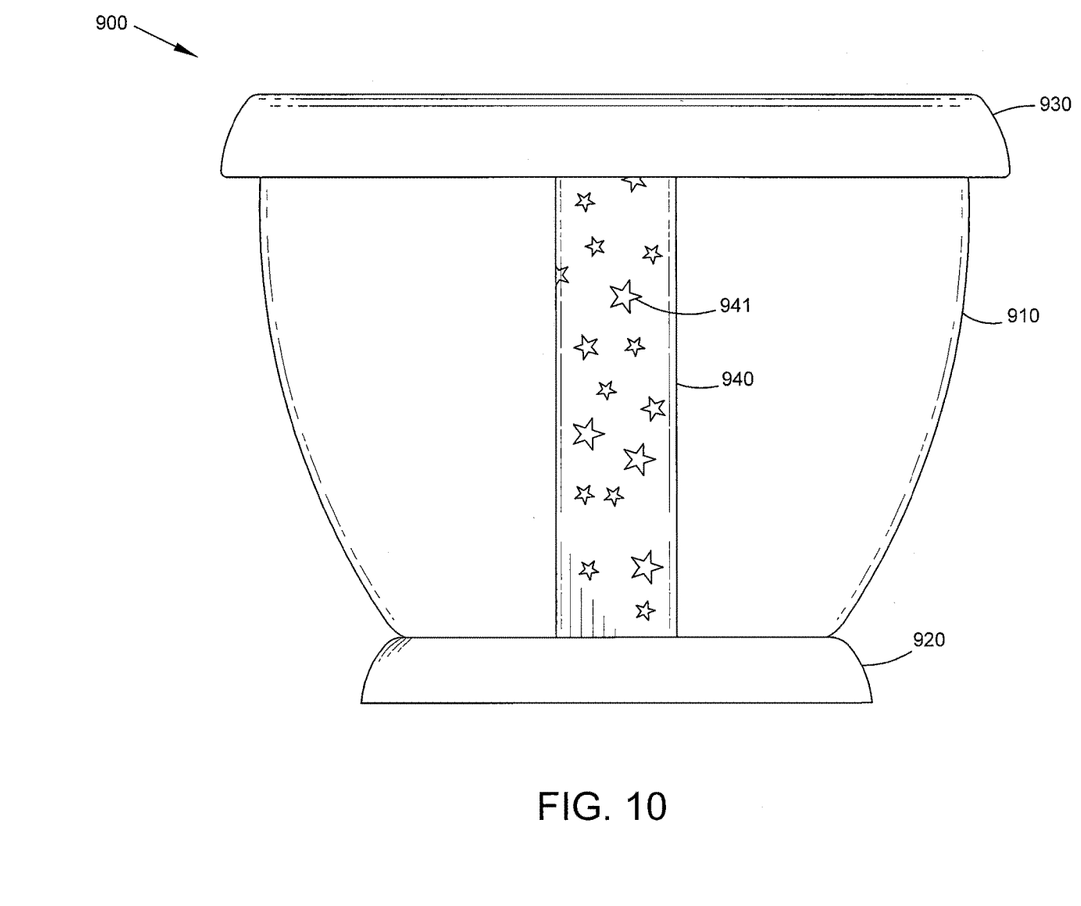
FIG. 10 is a front elevation view of the night light aquarium of FIG. 9 according to an embodiment of the present subject matter.

FIG. 10 is a front elevation view of the night light aquarium of FIG. 9 according to an embodiment of the present subject matter, showing the bowl 910, the base 920, and lid 930, the hollow member 940 having apertures 941.

Although examples are illustrated and described herein, embodiments are nevertheless not limited to the details shown, since various modifications and structural changes may be made therein by those of ordinary skill within the scope and range of equivalents of the claims.

We claim:

1. An aquarium apparatus comprising: a base including a central portion, one or more lighting elements disposed in the central portion, and a raised ridge disposed on at least a segment of a periphery of the central portion; a bowl including a body portion, a bottom portion connected to the body portion, and a neck portion at a top of the bowl defining a first opening at the top of the bowl, wherein the bowl is configured to retain liquid therein, wherein the bottom portion is dimensioned to fit within the raised ridge when the bowl is placed on top of the base; a lid dimensioned to fit over the first opening at the top of the bowl, wherein the lid comprises a planar surface with a central aperture defining an inner edge portion, wherein a horizontal ledge section is connected to the inner edge portion, wherein the horizontal ledge section is connected to a downwardly extending portion that surrounds the central aperture; and a hollow member removably or fixedly attached to the downwardly extending portion, wherein the hollow member extends into the bowl substantially towards the bottom of the bowl and aligns over the one or more lighting elements, and wherein the hollow member is dimensioned to receive light emitted by the one or more lighting elements when the lid is placed on top of the bowl, wherein the light emitted by the one or more lighting elements passes through the hollow member.

2. The apparatus of claim 1, wherein the lid has a recessed portion including the horizontal ledge section connected to the inner edge portion and disposed on at least a segment of a periphery of the second opening.

3. The apparatus of claim 2, further comprising a first removable disk having a first plurality of apertures there through, wherein the first removable disk is dimensioned to rest on the horizontal ledge section.

4. The apparatus of claim 3, further comprising a second removable disk having a second plurality of apertures there through, wherein the second removable disk is dimensioned to rest on the horizontal ledge section, and wherein the second removable disk is interchangeable with the first removable disk.

5. The apparatus of claim 4 wherein at least some of the first plurality of apertures are of a shape that is different than a shape of at least some of the second plurality of apertures.

6. The apparatus of claim 3 wherein one of the first plurality of apertures is of a same shape but a different size than another one of the first plurality of apertures.

7. The apparatus of claim 3 wherein the lid includes an indentation region operatively connected to the horizontal ledge section for facilitating removal of the first removable disk.

8. The apparatus of claim 3 wherein light emitted by the one or more lighting elements passes through the hollow member and through at least some of the first plurality of apertures when the first removable disk is resting on the horizontal ledge section.

9. The apparatus of claim 1 wherein a side of the hollow member is translucent.

10. The apparatus of claim 1 wherein the hollow member is opaque and includes one or more apertures along a side of the member.

11. The apparatus of claim 1 wherein at least one of the one or more lighting elements is a light emitting diode.

12. The apparatus of claim 1 wherein the base includes a port for receiving an electrical cable for providing electrical power to the one or more lighting elements.

13. The apparatus of claim 1 wherein the base includes a battery receptacle and a switch operatively coupled to the battery receptacle and to the one or more lighting elements.

14. The apparatus of claim 1 wherein light emitted by the one or more lighting elements changes color over time.

15. The apparatus of claim 1 wherein a first one of the one or more lighting elements emits light having a first color and a second one of the one or more lighting elements emits light having a second color.

16. An aquarium apparatus comprising: a circular base including a central portion, one or more lighting elements disposed in the central portion, and a circular raised ridge disposed at least partially surrounding the central portion; a bowl including a body portion, a circular bottom portion connected to the body portion, and a circular neck portion at a top of the bowl defining a circular opening at the top of the bowl, wherein the bowl is configured to retain liquid therein, wherein the bottom portion is dimensioned to fit within the raised ridge when the bowl is placed on top of the base; an annular lid dimensioned to fit over the circular opening at the top of the bowl, wherein the lid comprises a planar surface with a central aperture defining an inner edge portion, wherein a horizontal ledge section is connected to the inner edge portion, wherein the horizontal ledge section is connected to a downwardly extending portion that surrounds the central aperture; and a cylindrical hollow member removably or fixedly attached to the downwardly extending portion, wherein the cylindrical hollow member extends into the bowl substantially towards the bottom of the bowl and aligns over the one or more lighting elements, and wherein the cylindrical hollow member is dimensioned to receive light emitted by the one or more lighting elements when the annular lid is placed on top of the bowl, wherein the light emitted by the one or more lighting elements passes through the cylindrical hollow member.

17. The apparatus of claim 16 wherein the annular lid further includes a lip extending downwardly from an outer boundary at an outer diameter, wherein the outer diameter is dimensioned to cause the lip to surround the circular neck portion when the lid is placed on top of the bowl.

18. The apparatus of claim 16 further comprising a recessed portion at the inner edge boundary wherein the recessed portion includes the horizontal ledge section, and further comprising a first removable disk having a first plurality of apertures there through, wherein the first removable disk is dimensioned to rest on the horizontal ledge section.

19. The apparatus of claim 18 wherein light emitted by the one or more lighting elements passes through the cylindrical hollow member and through at least some of the first plurality of apertures when the first removable disk is resting on the horizontal ledge section.

20. An aquarium apparatus comprising: a base including a central portion, one or more lighting elements disposed in the central portion, and a raised ridge at least partially surrounding the central portion; a bowl including a body portion, a bottom portion connected to the body portion, and a neck portion at a top of the bowl defining a first opening at the top of the bowl, wherein the bowl is configured to retain liquid therein, wherein the bottom portion is dimensioned to fit within the raised ridge when the bowl is placed on top of the base; a lid dimensioned to fit over the first opening at the top of the bowl, wherein the lid comprises a planar surface with a central aperture defining an inner edge portion, wherein a horizontal ledge section is connected to the inner edge portion, wherein the horizontal ledge section is connected to a downwardly extending portion that surrounds the central aperture; a first removable disk having a first plurality of apertures there through, wherein the first removable disk is dimensioned to rest on the horizontal ledge section; and a translucent hollow member removably or fixedly attached to the downwardly extending portion, wherein the translucent hollow member extends into the bowl substantially towards the bottom of the bowl and aligns over the one or more lighting elements, and wherein the translucent hollow member is dimensioned to receive light emitted by the one or more lighting elements when the lid is placed on top of the bowl, wherein the light emitted by the one or more lighting elements passes through the translucent hollow member and through at least some of the first plurality of apertures when the first removable disk is resting on the horizontal ledge section.

* * * * *